UNITED STATES PATENT OFFICE.

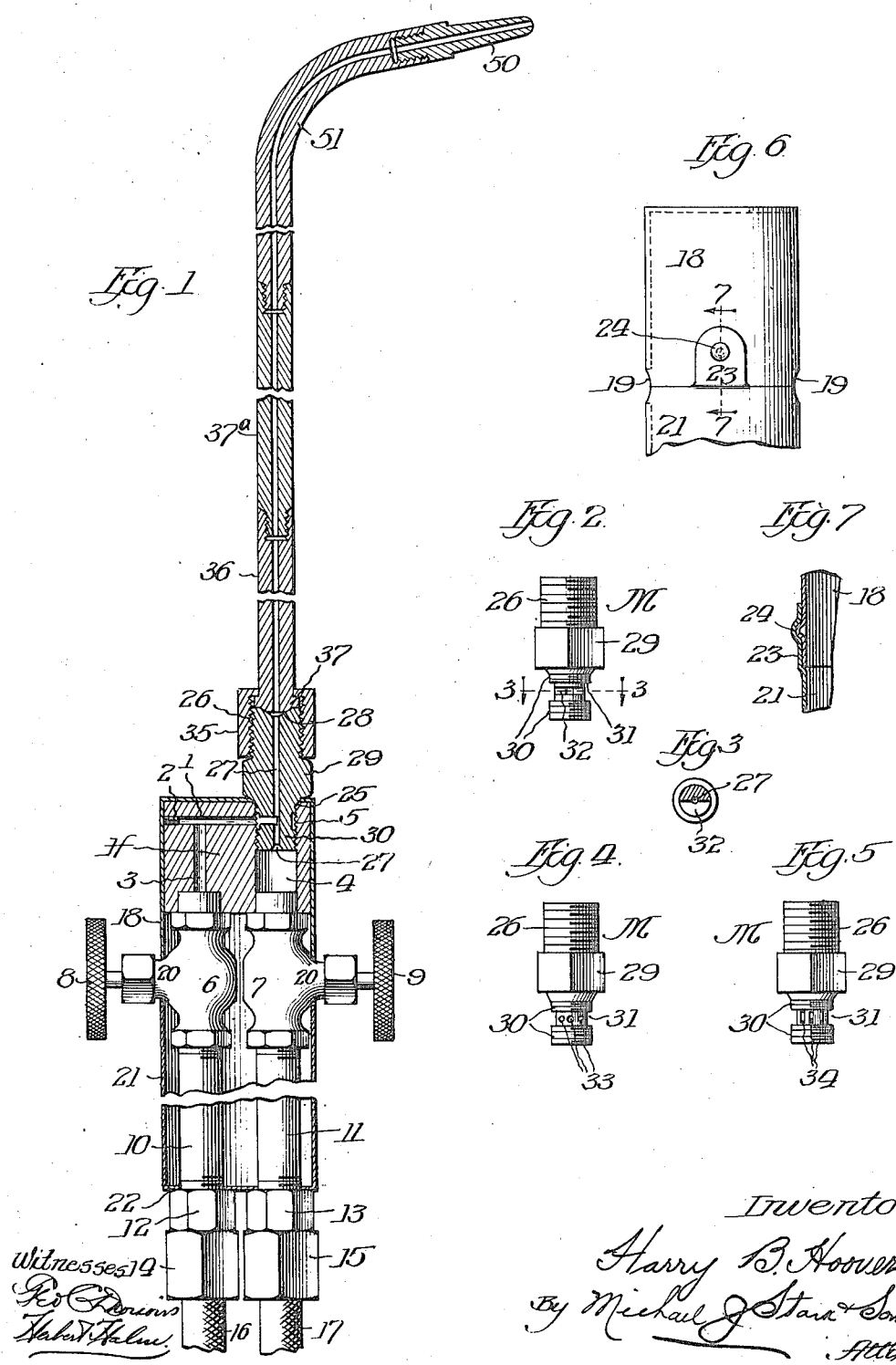

HARRY B. HOOVER, OF CHICAGO, ILLINOIS.

WELDING-TORCH.

1,092,913.

Specification of Letters Patent. Patented Apr. 14, 1914.

Application filed July 25, 1913. Serial No. 781,165.

*To all whom it may concern:*

Be it known that I, HARRY B. HOOVER, a citizen of the United States, and a resident of the city of Chicago, in the county of Cook and State of Illinois, have invented a certain new and useful Improvement in Welding-Torches; and I do hereby declare that the following description of my said invention, taken in connection with the accompanying sheet of drawings, forms a full, clear, and specific specification, which will enable others skilled in the art to which it appertains to make and use the same.

My invention relates generally to improvements in welding torches, and it consists, essentially, in the novel and peculiar combination of parts and details of construction, as hereinafter first fully set forth and described and then pointed out in the claims.

In the sheet of drawing already referred to, which serves to illustrate my said invention more fully, Figure 1 is a vertical section of the same, certain parts being shown in elevation. Fig. 2 is an elevation of the mixer proper detached. Fig. 3 is a horizontal section in line 3—3 of Fig. 2. Figs. 4 and 5 are elevations of the mixer proper, disclosing modified construction. Fig. 6 is an elevation of a fragment of the handle portion of my device, and Fig. 7 a section in line 7—7 of Fig. 6.

Like parts are designated by corresponding characters or symbols of reference in all the figures of the drawing.

A welding torch of the oxy-hydrogen or oxy-acetylene type should be capable of being operated under all sorts of conditions in close and cramped quarters and also at points a considerable distance away from the operator. At the present time it is necessary for a welder to possess two or more torches of various sizes in order to handle satisfactorily and economically the wide range of work coming into a welding shop. Again, in outside or field repairs, such as welds in boilers, in contracted places, or the joining together of cracked parts in large assembled machines, where there is but little room for manipulation, it is necessary for the operator to lug into such cramped space a plurality of torches in order to be equipped for all conditions he may encounter. Furthermore, in torches of this class as now manufactured the mixture of the oxygen and the gas takes place closely adjacent to the flame tips employed, the result of which is a more or less continuous blowing out of the flame and the consequent necessary relighting thereof; all of which prolongs the time of completion of the job in hand and increases the cost thereof by reason of the partially finished weld often cooling off, coupled with the waste of gas and oxygen issuing from the burner tip without flame.

It is initially the aim of my invention to produce a single torch capable of handling all classes of work; whether in cramped places or in the open, from the lightest to the heaviest, or work right in front of the operator, or, a weld made in contracted places which cannot now be reached by the present day torches.

Another aim of my invention is the mixing of the gas and oxygen at a point distant from the flame or burner tip so as to eliminate the tendency to blow out or back flash.

Still another aim of my invention is the production of a torch which may be held in one hand and the regulation of the flow of oxygen and gas accomplished with the fingers of that hand without loosening the grip on the torch.

To better understand my device reference is now made to the drawings in which H indicates the "head" or mixer head proper. This element is made from a short piece of commercial round brass; a small chunk in fact. Drilled diametrically into this chunk, near the upper end thereof, and extending to a short distance from the opposite periphery is a small circular hole 1, the outer end of which hole is plugged by a plug 2. Drilled inwardly from the bottom face of head H there is another circular hole 3, which hole terminates at and connects directly with the initially drilled cross hole 1. Drilled entirely through the chunk H, parallel to hole 3, there is a larger opening 4, which opening is in direct communication with hole or passage 1. The upper end of said opening 4 is threaded at 5 to a depth considerably beyond the passageway 1 as clearly seen in Fig. 1.

To the lower face of the head H, communicating directly with the passages 3 and 4, are fixed by the process of brazing or soldering, needle regulating valves 6 and 7, which are possessed of knurled or other manipulating handles 8 and 9 located on diametrically opposite sides of, though a short distance below, the head or chunk H. Into the free ends of valves 6 and 7 are fitted short tubes 10 and 11, respectively, and at the ends of these tubes are fixed unions 12 and 13 for the reception of union nuts 14 and 15 of the gas and air supply hose 16 and 17.

Surrounding the head or chunk H there is a thin sheet metallic cup 18, the lower edge of which is notched out on opposite sides as at 19, Fig. 6 to partially embrace the bonnets 20 of the valves 6 and 7 embracing and inclosing tubes 10 and 11 is a similar though longer cup 21, the upper edge of which is notched to embrace the lower portions of the bonnets 20. The bottom 22 of cup 21 is punctured for the passage therethrough of the tubes 10 and 11, and the unions 12 and 13 on said tubes serve to maintain said cup in proper position. Cups 18 and 21 abut each other, as per Fig. 6 and the latter cup is provided with oppositely located lips 23 projecting over the former; snap lugs 24 or similar means being employed to hold the cups together. Attention is now directed to the fact that these cups form the handle of the torch, and it will be observed that the handles 8 and 9 of the regulating valves 6 and 7 are in close proximity thereto, whereby the fingers of the hand holding the torch may manipulate either of said valve handles at will without in any way affecting the grip on the torch handle. This is an essential feature, as the operator is enabled to instantly regulate the flow of either the gas or the oxygen without being compelled to fumble around with the fingers of the free hand to accomplish this result. This feature will be fully appreciated by the operator who has had occasion to introduce a torch through an opening in a broken frame of a machine or other structure which is just large enough for one hand and the torch.

The upper end of the threaded opening 5 of the passage 4 is beveled outwardly at 25 to form a tight seating for a threaded shank 30 of a mixer proper M. Said mixer is produced from standard hexagonal brass rod in the screw machine and is provided with a small, axial passageway 27 throughout its length; its upper face is beveled inwardly to form a valvelike seating 28, and it has an exterior screw thread 26 at its upper end. Below this threaded part is left a hexagonal portion 29 for the application of a wrench, and below the latter the stock is reduced in diameter to produce an externally threaded shank 30 fitting the beveled seat 25 and the internal thread 5 in the opening 4. At a point where the small cross passage 1 in the head H meets the passageway 4, the shank 30 is further reduced in diameter to form a flat bottomed groove 31. This groove may have a horizontal saw slot 32 communicating with the interior axial passage 27 as in Figs. 2 and 3, or there may be provided a plurality of small drilled holes 33, Fig. 4, or a series of upright slots 34, Fig. 5 as may be desired.

Adapted to engage thread 26 of mixer M is a union nut 35 embracing an axially drilled tube 36 having a shoulder 37 for said nut, the lower face of which shoulder is beveled to form a tight joint against seating 28. The free end of tube 36 is inwardly beveled and interiorly threaded to accept the male threaded and beveled portion of another section of tubing 37$^a$, which latter section is similarly beveled and threaded at its free end for the reception of still another section. There may be any reasonable number of sections thus jointed together so as to meet such conditions where the weld to be made is in a place inaccessible to either man or torch. It is to be understood that the outermost section of tube is exteriorly threaded to receive a flame tip 50, which outermost section 51 may be bent on an arc of a circle or oval; and, it is the intention to supply several of such sections of various radii with each torch, as well as tips of different sizes for various classes of work. It will thus be noted that all an operator requires to be equipped for any and all conditions is a single torch, a handful of tube extensions, a quantity of tips and the customary gas tanks and paraphernalia common to all torches of this class.

A unique application of this torch may be noted in the repair of boiler flues which have developed leaks several feet away from either head. In such work all that is necessary is to introduce a light of some kind into the tube to locate the leak, affix enough tube extensions to the torch, shove into the flue, by means of the tip, a button of iron or steel as the case may be, start the flame and go ahead. Another application is the welding of boiler flues into the heads thereof. In this case only one straight tube extension with a tip is required. The torch can be made to follow the edge of the tube to be welded by a mere twisting motion of the wrist of the operator.

The operation of my torch is self evident, but it may be explained that the acetylene enters through hose 16, tube 10, valve 6, passages 3 and 1, and then into the mixer through the openings 32, 33, or 34 therein, wherein the gas is taken up by the upflowing current of oxygen through passageway 4 and passed into the tubes 36—37$^a$ and the like.

While herein I have disclosed the preferred construction of my device, I desire it understood that I may make such changes and alterations therein as might suggest themselves to one skilled in the art or permitted by the doctrine of equivalents without departing from the spirit or scope of the invention.

Having thus fully described my invention I claim as new and desire to secure to myself by Letters Patent of the United States:—

1. A welding torch including a mixer head and a mixer therein, fuel supply and regulating devices in connection with said mixer head and mixer, a tubular hand grip surrounding said mixer head and regulating devices, said regulating devices having manipulating means projecting exteriorly of said grip on diametrically opposite sides thereof, and located in close proximity thereto, whereby the fingers of a hand grasping said hand grip may manipulate said means without loosening the grasp on said grip, and a flame tip connected to said mixer.

2. A welding torch including a mixer head and a removable mixer therein, fuel supply and regulating devices in connection with said mixer head and mixer, a tubular hand grip surrounding said mixer head and regulating devices, said regulating devices having manipulating means projecting exteriorly of said grip on diametrically opposite sides thereof, and located in close proximity thereto, whereby the fingers of a hand grasping said hand grip may manipulate said means without loosening the grasp on said grip, and a flame tip connected to said mixer.

3. A welding torch including a mixer head and a mixer therein, fuel supply and regulating devices in connection with said mixer head and mixer, a tubular hand grip surrounding said mixer head and regulating devices, said regulating devices having manipulating means projecting exteriorly of said grip on diametrically opposite sides thereof, and located in close proximity thereto, whereby the fingers of a hand grasping said hand grip may manipulate said means without loosening the grasp on said grip, and a jointed and extensible outlet tube connected to said mixer and a flame tip at the outermost end thereof.

4. A welding torch including a mixer head and a removable mixer therein, fuel supply and regulating devices in connection with said mixer head and mixer, a tubular hand grip surrounding said mixer head and regulating devices, said regulating devices having manipulating means projecting exteriorly of said grip on diametrically opposite sides thereof, and located in close proximity thereto, whereby the fingers of a hand grasping said hand grip may manipulate said means without loosening the grasp on said grip, and a jointed and extensible outlet tube connected to said mixer and a flame tip at the outermost end thereof.

5. A welding torch comprising a flame tip, a jointed, extensible supply tube therefor, a mixing device connected to said tube remotely from said flame tip, a handle connected to said mixer, fuel supply and regulating means in connection with said mixer and located in close proximity to said handle, on opposite sides thereof, whereby the fingers of a hand grasping said handle may manipulate said regulating means without loosening the grip on said handle.

6. A welding torch comprising a handle, fuel regulating means within said handle, partially extending exteriorly thereof for manipulation, a mixer head entirely within said handle connected to said regulating means, a mixer connected to said mixer head and extending exteriorly of said handle, a single jointed outlet tube issuing from said mixer, and a flame tip attached to the free end of said outlet tube.

7. A welding torch comprising a tubular handle, a mixer head entirely within said handle, two fuel passages in said head terminating in one fuel outlet therefrom, a removable mixer secured in said outlet and extending without said handle, a single jointed outlet tube extending from said mixer, a flame tip attached to the free end of said tube, regulating means within said handle and extending partially exteriorly thereof, said means being connected to said fuel passages.

In testimony whereof I have hereunto set my hand in the presence of two subscribing witnesses.

HARRY B. HOOVER.

In the presence of—
CHARLES H. KNIGHT,
WILLIAM O. STARK.